(12) United States Patent
Charrin

(10) Patent No.: US 8,640,962 B2
(45) Date of Patent: Feb. 4, 2014

(54) RADIOFREQUENCY IDENTIFICATION DEVICE AND METHOD FOR PRODUCING SAID DEVICE

(75) Inventor: Philippe Charrin, Villeurbanne (FR)

(73) Assignee: ID3S—Identification Solutions Systems & Services (FR)

( * ) Notice: Subject to any disclaimer, the term of this patent is extended or adjusted under 35 U.S.C. 154(b) by 690 days.

(21) Appl. No.: 12/513,810

(22) PCT Filed: Nov. 6, 2007

(86) PCT No.: PCT/FR2007/001829
§ 371 (c)(1),
(2), (4) Date: Aug. 19, 2009

(87) PCT Pub. No.: WO2008/065278
PCT Pub. Date: Jun. 5, 2008

(65) Prior Publication Data
US 2009/0314842 A1    Dec. 24, 2009

(30) Foreign Application Priority Data
Nov. 6, 2006  (FR) ...................................... 06 09666

(51) Int. Cl.
*G06K 19/06* (2006.01)
*H01L 23/02* (2006.01)

(52) U.S. Cl.
USPC ........................................ 235/492; 257/679

(58) Field of Classification Search
USPC ........................................ 235/492; 257/679
See application file for complete search history.

(56) References Cited

U.S. PATENT DOCUMENTS

| 4,222,516 A | * | 9/1980 | Badet et al. | ................... 235/492 |
| 4,843,225 A | * | 6/1989 | Hoppe | ........................ 235/492 |
| 5,013,900 A | * | 5/1991 | Hoppe | ........................ 235/492 |
| 6,147,604 A | | 11/2000 | Wiklof et al. | |
| 6,371,380 B1 | | 4/2002 | Tanimura | |
| 2002/0179721 A1 | * | 12/2002 | Elbaz et al. | ................... 235/492 |
| 2002/0188259 A1 | | 12/2002 | Hickle et al. | |

FOREIGN PATENT DOCUMENTS

| EP | 1559653 | 8/2005 |
| EP | 1630730 | 3/2006 |
| WO | 03030093 | 4/2003 |
| WO | 03067512 | 8/2003 |

OTHER PUBLICATIONS

International Search Report PCT/FR2007/001829; Dated Jun. 6, 2008.

* cited by examiner

*Primary Examiner* — Jamara Franklin
(74) *Attorney, Agent, or Firm* — Cantor Colburn LLP

(57) ABSTRACT

The radio-frequency identification device includes embedded in an envelope a substrate on one face of which an antenna is produced and a chip connected to the antenna is positioned, a potting locally covering the substrate face level with the chip, an intermediate layer made of a magnetic superconductor material placed against the substrate on the antenna side, the intermediate layer having dimensions greater than those of the antenna so as to be able to cover the antenna and having a cavity arranged so that the potting and the chip can be approximately completely housed therein.

16 Claims, 3 Drawing Sheets

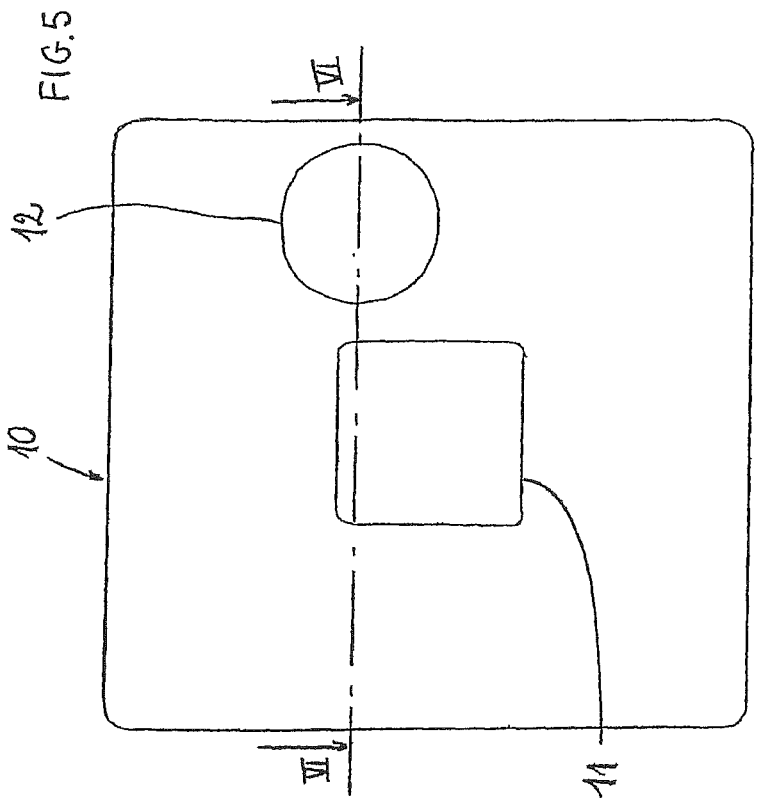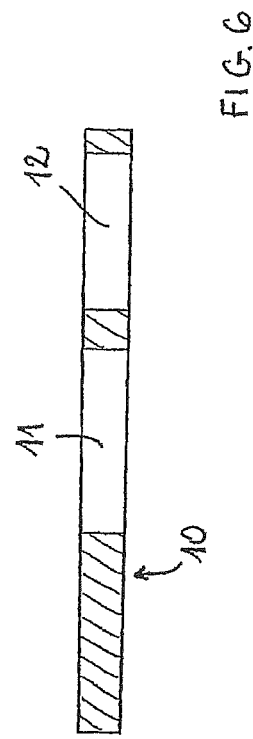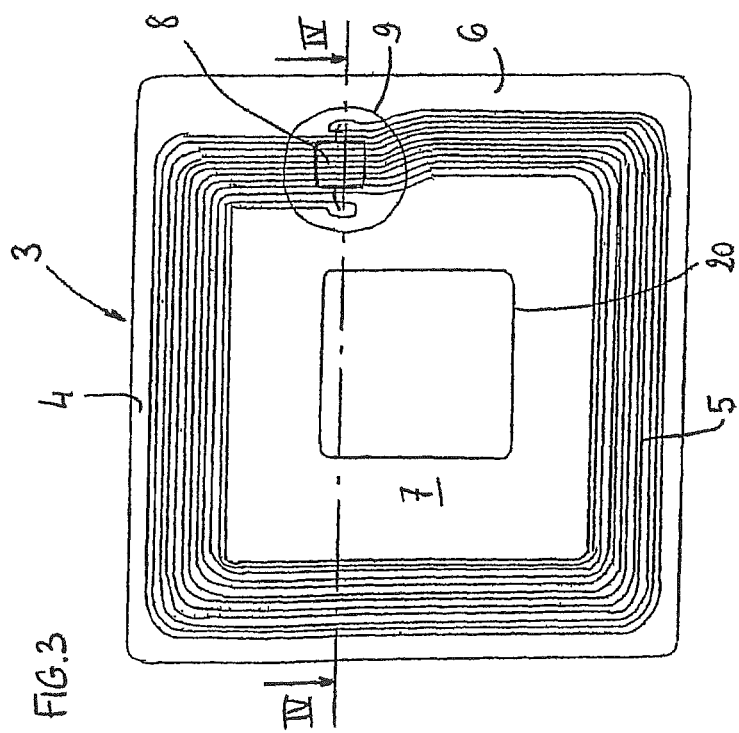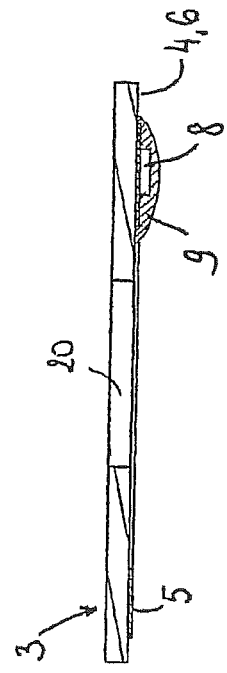

RADIOFREQUENCY IDENTIFICATION DEVICE AND METHOD FOR PRODUCING SAID DEVICE

TECHNICAL FIELD OF THE INVENTION

The present invention relates to a radio-frequency identification device and a method for producing such a device.

BRIEF DISCUSSION OF RELATED ART

Radio-frequency identification devices (RFID devices) make it possible to identify objects by using an electronic device—such as a memory chip—containing data and capable of transmitting information to a dedicated reader using an antenna. An identification tag or a contactless payment card are examples of such RFID devices.

Figure 1:
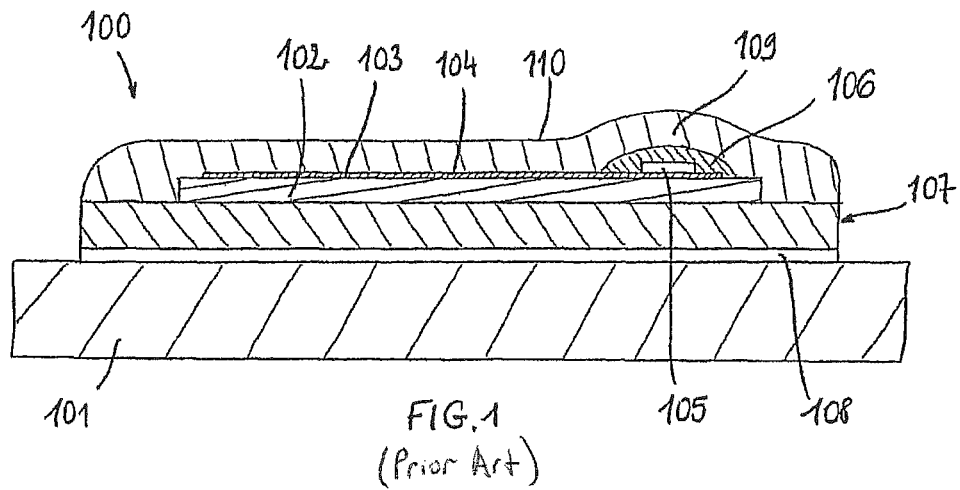

FIG. 1 shows a sectional view of an RFID tag 100 of the prior art affixed to a support 101. The tag 100 comprises a substrate 102, on one face 103 of which an antenna 104 is produced and a chip 105, connected to the antenna 104, is positioned. In addition, a potting 106 locally covers this face 103 of the substrate 102 level with the chip 105. The assembly formed from the substrate 102, the antenna 104, the chip 105 and the potting 106 is enclosed by an envelope 107. An adhesive layer 108 makes it possible to fix the tag 100 onto the support 101.

The chip 105 and the potting 106 form an area projecting relative to the antenna 104.

As a consequence, on the one hand, the production of the envelope 107, for example by lamination, may lead to damage to the chip 105 and impair proper functioning of the tag.

On the other hand, as illustrated in FIG. 1, once produced, the tag 100 has a boss 109 in line with the chip 105. Due to this, there is a risk that the tag 100 affixed to the support 101 may become unstuck when a person or an object bumps into the boss 109. In addition, as the visible face 110 of the tag 100, i.e. the face of the envelope 107 opposite the adhesive layer 108, is not planar, printing that may be produced there will not be of satisfactory quality. Thus the tag has an unaesthetic appearance. This may even lead to problems reading this information.

Another drawback of known RFID devices is that they cannot be affixed to a metal support or used in close proximity to a metal object, as the metal prevents correct transmission of the information contained in the chip by means of the antenna.

Furthermore, the rigidity of most known RFID tags is too high, which means that these tags cannot be located on warped supports. This rigidity is very often due to the significant thickness of these tags.

BRIEF SUMMARY OF THE INVENTION

The present invention aims to alleviate the drawbacks mentioned above.

To this end, and according to a first aspect, the invention relates to a radio-frequency identification (RFID) device comprising, embedded in an envelope, a substrate on one face of which an antenna is produced and a chip connected to the antenna is positioned, a potting locally covering said substrate face level with the chip. The radio-frequency identification device furthermore comprises, embedded in the envelope, an intermediate layer made of a magnetic superconductor material placed against the substrate on the antenna side, said intermediate layer having dimensions greater than those of the antenna so as to be able to cover it and having a cavity arranged so that the potting and the chip can be approximately completely housed therein.

"Embedded in the envelope" is understood to mean that the envelope completely encases the assembly formed by the substrate, the antenna, the potting and the intermediate layer, without this expression limiting the embodiment of the envelope to moulding, for example.

Due to the intermediate layer protecting the antenna, affixing the RFID device to a metal object does not impair the transmission of the information contained in the chip.

In addition, providing a cavity in the intermediate layer in order to house the potting has many advantages:
  the increase in the total thickness of the RFID device due to the presence of the intermediate layer is limited and at least partly compensated for by the fact that the thickness of the potting does not add to the thickness of the other constitutive layers of the RFID. The RFID device is therefore not very thick, despite the intermediate layer. Thus, in particular when the RFID device forms a tag, and depending on the materials used, it may have a rigidity sufficiently low to be able to be bent and affixed to a warped support. In addition, once affixed to the support, the RFID device offers little grip and there is therefore less risk of it being torn off from the support;
  there is no longer additional thickness of the RFID device level with the chip, and the visible face of the RFID device therefore does not comprise a boss. This makes it possible to produce very high quality printing on this face. In addition, the resistance of the RFID device to being torn off is reduced considerably by eliminating the localized boss of the prior art; and
  as the chip and its potting are housed in the cavity, these elements are protected during production of the envelope.

It should be noted that the cavity formed in the intermediate layer is localized and therefore has no negative consequences for the magnetic superconductor function of this intermediate layer.

Advantageously, the potting is completely contained in the cavity of the intermediate layer, i.e. its thickness is less than that of the intermediate layer. An embodiment in which the potting slightly exceeds the intermediate layer is nonetheless conceivable.

The invention makes it possible to produce RFID tags that can be affixed to metal cylinders containing gases or liquids under pressure such as fire extinguishers, diving tanks or air tanks used by fire-fighters. More generally, such a tag may make it possible to identify the various pieces of equipment used by fire-fighters (helmet, pressure valve, jacket, etc.) and to track each of these pieces of equipment during the various operations they are subject to in the course of their lifetime: mandatory requalification, regular inspection visits, maintenance, cleaning, filling, etc. Of course, these applications are not limiting.

According to one possible embodiment, the intermediate layer is made of a radio-frequency superconductor material, for example made of a material containing ferrite.

The thickness of the intermediate layer is, for example, between 200 and 600 μm.

The cavity formed in the intermediate layer may be a through orifice, for example with a diameter of between 4 and 8 mm.

Advantageously, the antenna forms a ring and the intermediate layer comprises a through hole positioned facing a through hole formed in the central area formed by the antenna. This makes it possible to create an additional adhesive area between the part of the envelope situated on the side of the substrate and the part of the envelope situated on the side of the intermediate layer, which improves the strength of the assembly.

The envelope is made, for example, of one or more materials chosen, depending on temperature constraints to be withstood, from silicones, polyurethanes, polyethylenes, and polyamides, while the substrate may be made of a material chosen from PET (polyethylene terephthalate), PVC (polyvinyl chloride), and a glass fibre/epoxy resin composite.

In addition, the RFID device may comprise an adhesive layer joined to one face of the envelope. The device then usually forms an RFID tag designed to be bonded to a support.

According to a second aspect, the invention relates to a method for producing a radio-frequency identification device in which a substrate is provided, on one face of which an antenna is produced and a chip connected to the antenna is positioned, a potting locally covering said substrate face level with the chip. According to a general definition of the invention, the method furthermore comprises the steps consisting in:
   providing an intermediate layer made of a magnetic superconductor material having dimensions greater than those of the antenna and having a cavity arranged so that the potting can be approximately completely housed therein;
   placing the intermediate layer against the substrate on the antenna side so that the antenna is covered by the intermediate layer and the potting located in the cavity;
   producing an envelope around the assembly formed by the substrate, the antenna, the potting and the intermediate layer.

According to one possible embodiment of the invention, the envelope comprises a first layer placed on the side of the face of the intermediate layer opposite the substrate, and a second layer on the side of the face of the substrate opposite the antenna, the radio-frequency identification device being produced by laminating its various constitutive layers.

As a variant, the envelope may be produced by moulding.

Depending on the case, the layer and the envelope are held together by bonding or by lamination.

The invention also relates to an object characterized in that it receives a device as previously defined.

According to some applications, the envelope covers at least part of the outer surface of the object. It is thus envisaged that the device envelope at least partly constitutes the outer layer of the object.

It is also conceivable that the envelope covers the entire outer surface of the object. The envelope thus forms the skin of the object and the device is then an integral part of the object.

BRIEF DESCRIPTION OF THE INVENTION

Figure 2:
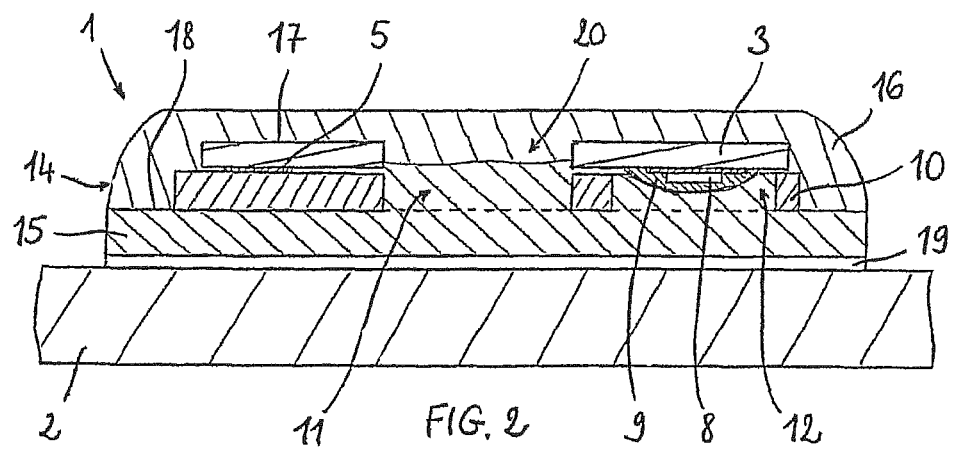
Figure 7:
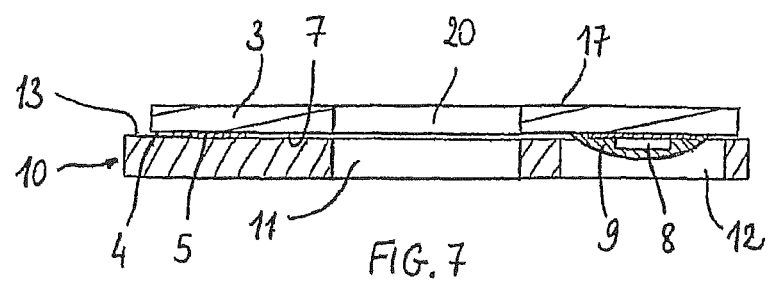
Figure 8:
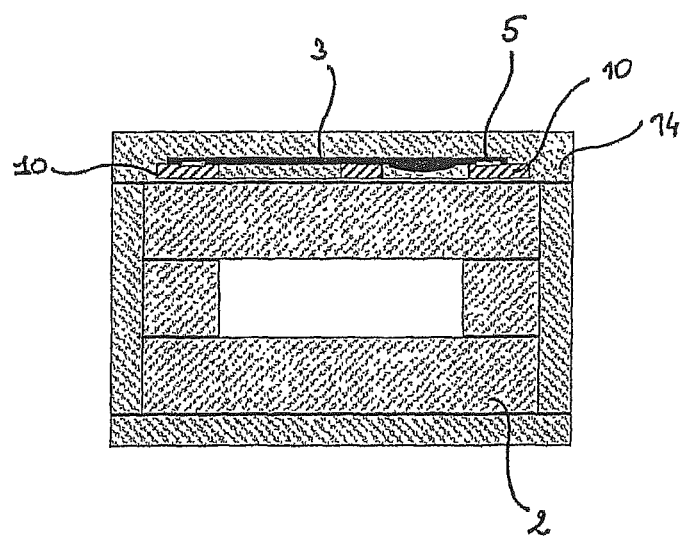

By way of nonlimiting example, several possible embodiments of the invention will now be described with reference to the appended figures:
   FIG. 1 is a cross section of an RFID tag of the prior art, affixed on a support;
   FIG. 2 is a cross section of an RFID tag according to the invention, affixed on a support;
   FIG. 3 is an elevation of the substrate that forms part of the tag of FIG. 2;
   FIG. 4 is a cross section along the line IV-IV of FIG. 3;
   FIG. 5 is an elevation of the intermediate layer forming part of the tag of FIG. 2;
   FIG. 6 is a cross section along the line VI-VI of FIG. 5;
   FIG. 7 is a cross section of the substrate and of the intermediate layer assembled for producing the RFID tag of FIG. 2; and
   FIG. 8 is a cross section of another embodiment of the invention.

DETAILED DESCRIPTION OF THE INVENTION

FIG. 2 shows an RFID tag 1 affixed to a support 2, which may especially be a metal support. The support 2 illustrated is planar, but it may be warped, and for example cylindrical.

The tag 1 comprises, first of all, a substrate 3, shown in greater detail in FIGS. 3 and 4. The substrate 3 here is an approximately square film, with sides close to 3 cm and of a thickness that may be between 100 and 200 µm, for example around 120 µm±10 µm. The substrate 3 may be made of a material chosen from PET (polyethylene terephthalate), PVC (polyvinyl chloride) or a glass fibre/epoxy resin composite.

On a first face 4 of the substrate 3 is arranged an antenna 5. The antenna 5 is made of copper here along a coil comprising for example 9 turns, and has a thickness of 40 µm±10 µm. The antenna 5 forms approximately a square with sides close to 27.35 mm and bounded on the substrate 3 by a peripheral strip 6 with a width of around 1 to 3 mm on the one hand, and by an approximately square central area 7 on the other hand.

An approximately central through hole 20, at a distance from the antenna 5, is formed in the central area 7. The through hole 20 here has the shape of a square that may have a side from 8 to 10 mm.

A chip 8 is positioned on the substrate 3 and connected to the antenna 5. A potting 9, for example made of epoxy resin, covers the chip 8 along with the area of the substrate 3 and of the antenna 5 surrounding the chip 8. The potting 9 here forms an approximately circular drop with a diameter close to 4 mm. The maximum thickness of the substrate 3 and of the potting 9 is around 650 µm±10 µm. It should be noted that, in FIG. 3, the potting 9 has been shown as if it were transparent, so that the chip 8 and the ends of the antenna 5 are visible.

The tag 1 also comprises an intermediate layer 10, shown in greater detail in FIGS. 5 and 6, which has the role of enabling the antenna 5 to operate well, even in the presence of metal in an environment close to the tag 1. This intermediate layer 10 may be made of a radio-frequency superconductor material, for example of a material containing ferrite. It may be formed from a Flexield® film, marketed by TDK. In the embodiment illustrated, the thickness of the intermediate film 10 is around 500 µm.

The intermediate layer 10 here forms a square with sides close to 4 cm. It may comprise an approximately central through hole 11, with dimensions smaller than those of the central area 7 of the substrate 3, intended to be superposed over the through hole 20 (therefore, for example, the through hole 11 is a square with sides of 8 to 10 mm), and a through orifice 12. The orifice 12 is here approximately circular, with a diameter close to 6 or 7 mm. It may be formed by perforation of the intermediate layer 10.

In other embodiments of the invention, it is conceivable to provide the intermediate layer 10 of superconductor with a single opening that encompasses the through hole 11 and the orifice 12.

To produce the tag 1, the intermediate layer 10 is placed against the face 4 of the substrate 3 so that the potting 9 is housed in the orifice 12 and the hole 11 is situated facing the hole 20 in the central area 7 (FIG. 7). A peripheral strip 13 of the intermediate layer 10 then passes beyond the edge of the substrate 3, which enables effective protection of the antenna 5. This peripheral strip 13 may have a width of 3 to 5 mm, for example 4 mm.

The substrate 3 bearing the antenna 5, the chip 8 and the potting 9, along with the intermediate layer 10, are enclosed in an envelope 14 ensuring mechanical and thermal protection of the antenna 5 and the chip 8.

The envelope 14 may be made of one or more materials chosen from silicones, polyurethanes, polyethylenes, and polyamides, or any other material having the properties required for the application considered, especially in terms of mechanical strength and thermal resistance.

The envelope 14 here consists of a first layer 15 positioned on the side of the face of the intermediate layer 10 opposite the substrate 3, and a second layer 16 positioned on the side of the face 17 of the substrate 3 opposite the antenna 5. The thickness of each of the layers 15, 17 may vary from 300 µm to 500 µm. The layers 15, 17 have in addition sizes sufficient to pass beyond the edge of the intermediate layer 10 and thus to be able to be attached to one another at a peripheral strip 18. This peripheral strip 18 may have a width of 2 to 5 mm, for example 3 mm.

According to a first embodiment, the tag 1 is produced by lamination.

According to a second embodiment, the tag 1 is produced by moulding. It may be injection moulding, moulding by gravity casting, at ambient temperature or with heating.

Whatever embodiment is adopted, in the course of forming the tag 1, on the one hand, the first layer 15 of the envelope 14 penetrates the orifice 12, thus embedding the potting 9. It should be noted that this does not cause a localized lack of thickness in the tag 1. On the other hand, the layers 15, 16 of the envelope 14 penetrate the through holes 11, 20, which enables good adhesion of these layers to one another.

Although the envelope 14 has been presented as consisting of two distinct layers 15, 16 (which is the case in particular for lamination), the envelope 14 may also be formed of only a single piece (for example if it is obtained by moulding).

The tag 1 may finally comprise an adhesive layer 19 joined to the first layer 15 of the envelope 14. The adhesive layer 19 has, for example, a thickness close to 170 µm.

The tag 1 thus obtained has the overall shape of a parallelepiped of a thickness less than 2 mm, and for example of around 1.5 mm. Viewed in elevation, the tag 1 substantially forms a square with sides close to 4 to 5 cm.

FIG. 8 shows a variant embodiment in which the envelope 14 covers the entire object that forms the support 2 on which the tag 1 is affixed. As can be seen in this figure, the envelope 14 then forms the outer surface.

The object in question may be, by way of illustrative example, a gas cylinder, for example for medical use, for which the identification has a critical character. In this case, the envelope 14 is the epoxy resin layer which is the outer layer of the object. The tag 1 is thus completely integrated in the object, which is a guarantee of security as no tearing off is then possible.

Among the advantages and the features of the tag—or, more generally, of the RFID device—according to the invention, it is possible to cite:

the possibility of contactless transmission of information via the tag over a distance of around 1 to 5 cm;
depending on the constituent material of the envelope, the possibility of storage between −20° C. and +85° C., and resistance to temperatures that can reach 100, 150 or even 200 or 250° C. for several minutes, enabling use for fire fighting equipment;
permeability to high frequencies (range from 13 MHz);
mechanical resistance to shearing and to impacts in a horizontal position;
flexibility, enabling the tag to be bonded to warped supports (cylinders with a radius of 5 to 15 cm);
electrical non-conductivity;
the possibility of printing information on the visible face of the tag (logo, series number, batch number, etc.);
watertightness in sea water up to 20 bar and in hot water at 80° comprising detergents; and
the fact that the tag is self-extinguishing.

Thus the invention brings a decisive improvement to the prior art by providing an RFID device which, while being able to be used in an environment containing metal, is of limited thickness and does not have a boss, with all the advantages that follow from this.

It is obvious that the invention is not limited to the embodiment described above by way of example, but that in contrast it comprises all the variant embodiments. The invention may, for example, be applied to mobile devices, for example telephony devices, to give them a contactless payment function. In this type of application, it is important to isolate the contactless payment function in order to avoid any interference with the electronic and/or metal part of a telephony device. The invention thus makes it possible to fit an RFID or NFC tag into a mobile telephony device in extremely small bulk.

The invention claimed is:

1. A radio-frequency identification device comprising, embedded in an envelope:
a substrate on one face of which an antenna is produced and a chip connected to the antenna is positioned,
a potting locally covering said substrate face level with the chip, wherein the radio-frequency identification device furthermore comprises, embedded in the envelope,
an intermediate layer made of a magnetic superconductor material placed against the substrate on the antenna side, said intermediate layer having dimensions greater than dimensions of the antenna so as to cover the antenna and having a cavity arranged so that the potting and the chip is substantially completely housed therein.

2. Device according to claim 1, wherein the intermediate layer is made of a radio-frequency superconductor material containing ferrite.

3. Device according to claim 1, wherein the intermediate layer has a thickness of between 200 and 600 □m.

4. Device according to claim 1, wherein the cavity formed in the intermediate layer is a through orifice with a diameter of between 4 and 8 mm.

5. Device according to claim 1, wherein the antenna forms a ring and the intermediate layer comprises a through hole positioned facing a through hole formed in the central area formed by the antenna.

6. Device according to claim 1, wherein the envelope is made of a material comprising one or more of silicones, polyurethanes, polyethylenes, polyamides, and epoxy resins.

7. Device according to claim 1, wherein the substrate is made of a material comprising at least one of PET (polyethylene terephthalate), PVC (polyvinyl chloride), and a glass fibre/epoxy resin composite.

8. Device according to claim 1, further comprising an adhesive layer joined to one face of the envelope.

9. Method for producing a radio-frequency identification device in which a substrate is provided, on one face of which an antenna is produced and a chip connected to the antenna is positioned, a potting locally covering said substrate face level with the chip, the method comprising:
providing an intermediate layer made of a magnetic superconductor material having dimensions greater than dimensions of the antenna and having a cavity arranged so that the potting is substantially completely housed therein;

placing the intermediate layer against the substrate on the antenna side so that the antenna is covered by the intermediate layer and the potting is located in the cavity;

producing an envelope around the assembly formed by the substrate, the antenna, the potting and the intermediate layer.

10. Method according to claim 9, wherein the envelope comprises a first layer placed on a side of the face of the intermediate layer opposite the substrate, and a second layer on a side of the face of the substrate opposite the antenna, the radio-frequency identification device being produced by laminating various constitutive layers.

11. Method according to claim 9, wherein the envelope is produced by moulding.

12. Method according to claim 9, wherein the layer and envelope are held together by bonding.

13. Method according to claim 9, wherein the layer and the envelope are held together by lamination.

14. Object, configured to receive radio-frequency identification device comprising, embedded in an envelope, a substrate on one face of which an antenna is produced and a chip connected to the antenna is positioned, a potting locally covering said substrate face level with the chip, wherein the radio-frequency identification device furthermore comprises, embedded in the envelope, an intermediate layer made of a magnetic superconductor material placed against the substrate on the antenna side, said intermediate layer having dimensions greater than dimensions of the antenna so as to cover the antenna and having a cavity arranged so that the potting and the chip is substantially completely housed therein.

15. Object according to claim 14, wherein the envelope covers at least part of an outer surface of the object.

16. Object according to claim 14, wherein the envelope covers an entire outer surface of the object.

* * * * *